No. 734,030. PATENTED JULY 21, 1903.
F. S. YOUNG.
PROCESS OF PRODUCING MAGNESIUM AND CALCIUM CARBONATES.
APPLICATION FILED APR. 3, 1902.
NO MODEL. 2 SHEETS—SHEET 1.
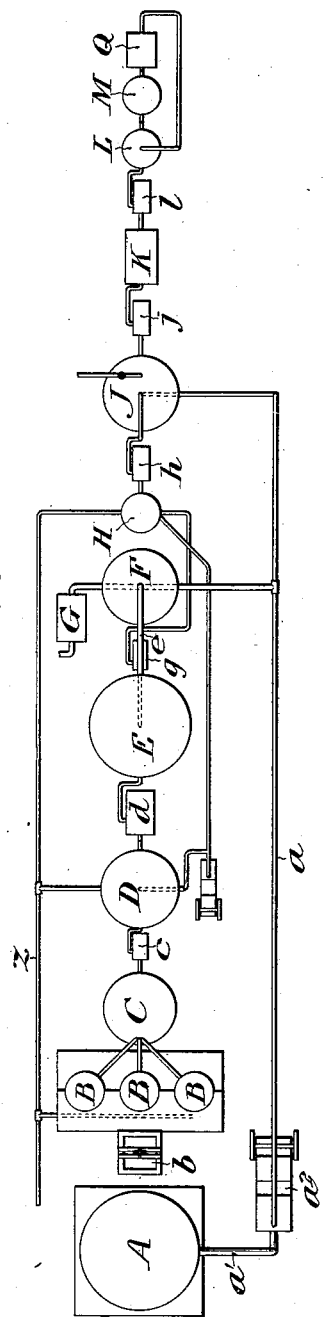
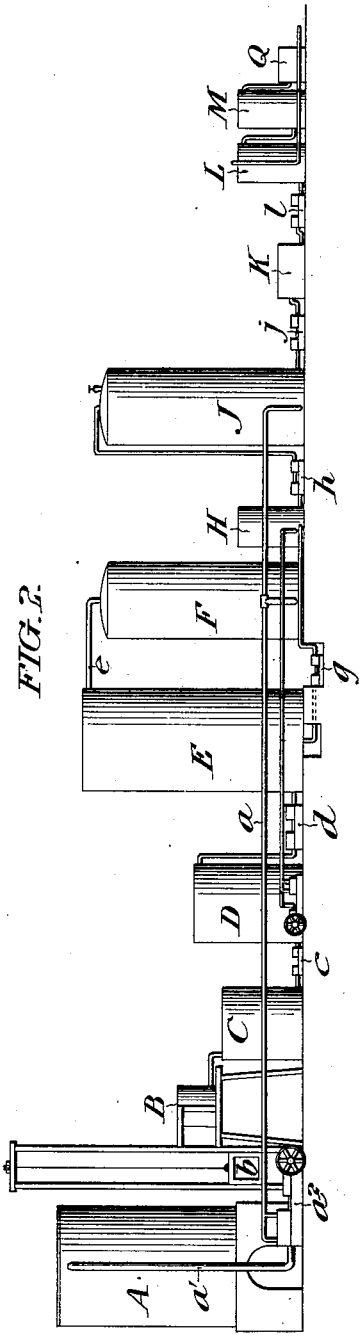
FIG.1.
FIG.2.
WITNESSES:
INVENTOR:

No. 734,030. PATENTED JULY 21, 1903.
F. S. YOUNG.
PROCESS OF PRODUCING MAGNESIUM AND CALCIUM CARBONATES.
APPLICATION FILED APR. 3, 1902.
NO MODEL. 2 SHEETS—SHEET 2.
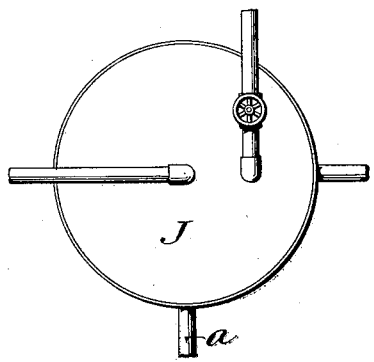
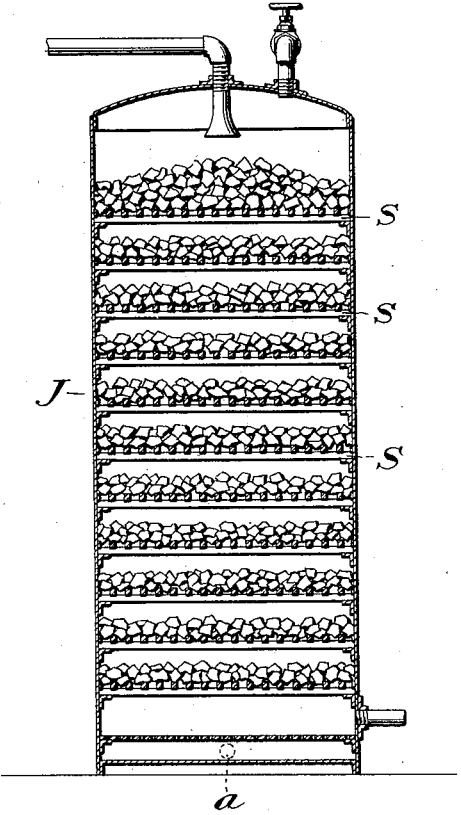

No. 734,030.

Patented July 21, 1903.

UNITED STATES PATENT OFFICE.

FRANK S. YOUNG, OF NORRISTOWN, PENNSYLVANIA.

PROCESS OF PRODUCING MAGNESIUM AND CALCIUM CARBONATES.

SPECIFICATION forming part of Letters Patent No. 734,030, dated July 21, 1903.

Application filed April 3, 1902. Serial No. 101,177. (No specimens.)

*To all whom it may concern:*

Be it known that I, FRANK S. YOUNG, a citizen of the United States, residing at Norristown, in the county of Montgomery and State of Pennsylvania, have invented certain new and useful Improvements in Processes of Producing Magnesium and Calcium Carbonates from Dolomite, of which the following is a specification, reference being had to the accompanying drawings.

The usual method of obtaining magnesium carbonate from dolomite consists in passing carbonic-acid gas through a body of water containing calcined dolomite, whereby the soluble magnesium bicarbonate thereby formed is dissolved out, converted by steam into the insoluble carbonate, and recovered by precipitation. This process relies upon the carbonating operation to effect the separation of the calcium from the magnesium salts. The objections to this process are the entire loss of lime, the comparative incompleteness of the separation effected, and the large quantity of water necessarily present in the carbonate solution, which must be heated in order to precipitate the carbonate. By my process I effect the separation of the two bases by settling or precipitation during that stage of the process when both of the oxids obtained from the calcined dolomite are mixed with water and prior to the carbonation. In this way I recover a great part of the lime, effect a more complete separation, and obtain a stronger bicarbonate solution, requiring less heat to effect the recovery of the carbonate. Furthermore, the small quantity of lime present when the magnesia is carbonated enables me to employ better methods of carbonation than can otherwise be used.

In the accompanying drawings, Figure 1 is a plan illustrating in diagrammatic form an apparatus suitable for carrying out my process. Fig. 2 is an elevation of the same. Fig. 3 is a plan view of the magnesia-carbonating tower. Fig. 4 is a sectional elevation of the same.

As the first step of my process dolomite is calcined in the kiln A, which does not differ from those heretofore used for this purpose. Dolomite is a mixture of carbonates of calcium and magnesium, and as a result of the calcining process the carbonic acid is driven off, leaving a friable mass consisting of lime and magnesia, with some impurities, chiefly silica, alumina, and iron. The carbonic-acid gas driven off at the top of the kiln is collected and carried by a downcomer $a'$ to a gas-compressor $a^2$, by which the gas is compressed and driven continuously into the carbonic-acid-gas-supply pipe $a$. The calcined dolomite is taken off from the bottom of the kiln and delivered by a hoist $b$ into one of a series of slaking-tanks B, where it is mixed with a sufficient amount of water from the water-supply pipe $z$ to properly slake the lime. From the tanks the slaked mixture is led into a reservoir C, from whence it is pumped by pump $c$ into the solution-tank D, where it is mixed with cold water from the water-supply pipe $z$. In both the reservoir C and the solution-tank D the contents are kept agitated either by mechanical devices or by a current of air blown through. In the solution-tank D the amount of cold water added is sufficient to take up in solution the greater part of the calcium hydrate, the magnesia and other insoluble contents being kept in suspension by agitation. From tank D the contents are pumped by pump $d$ into the large settling-tower E. This tower is furnished with a series of downwardly-sloping shelves perforated centrally, and as the milky liquid passes into the tower the magnesia and other insoluble matter slide down gradually to the bottom into a mud-drum, while a clear solution of calcium hydroxid appears at the top and is continuously drawn off by pipe $e$. It will therefore be observed that the separation of the bases is effected, while both the lime and magnesia are in the form of "oxids," (using that term as I do in a sufficiently broad sense to include hydroxids.) The lime-water from the top is led by pipe $e$ into a lime-carbonating tower F, where it is subjected to a current of carbonic-acid gas driven in at the bottom from the supply-pipe $a$. This converts the lime into an insoluble carbonate, which is recovered either by precipitation or by filtration, for which latter purpose the filter G is provided.

From the mud-drum at the bottom of the settling-tower E the magnesia sludge is pumped by a pump *g* into a small tank H, where the proper amount of water from supply-pipe *z* is mingled with it, the mixture being agitated either mechanically or by an air-blast. From this tank the water, with the magnesia and other salts in suspension, is pumped by a pump *h* into the magnesia-carbonating tower J. This tower is furnished with a series of gratings S S, on each of which is placed a layer of broken marble or dolomite. As the water carrying magnesia trickles down through the stone on these gratings it is subjected to the action of carbonic-acid gas delivered at the bottom of the tower from pipe *a*, by means of which the milk of magnesia is converted into a solution of magnesium bicarbonate, while any lime which is still present in the solution is by the same operation converted into insoluble calcium carbonate. As the lime forms only a small part of the matter present in the milk which entered the tower, the resulting solution of magnesium bicarbonate is stronger than can be obtained where all of the lime of the dolomite is still present. The contents of this tank are then pumped by pump *j* into a filter-press K, whereby all of the insoluble impurities (*e. g.*, lime, alumina, silica, or iron) are removed, and a clear solution of magnesium bicarbonate is thence pumped by pump *l* into a heat-interchanger L, wherein by a coil or otherwise the solution is partially heated by the waste liquid from the next compartment. From the heat-interchanger the heated bicarbonate solution is run into a boiling-tank M, where its temperature is raised to the boiling-point by steam blown in at the bottom. This boiling process decomposes the magnesium bicarbonate into an insoluble carbonate of magnesium, setting free carbon dioxid which is evolved. The precipitated magnesium carbonate is removed from its water of suspension by filtration in the filter Q, the waste liquid being run through the heat-interchanger, as previously explained. From the filter the pure magnesium carbonate is removed and dried.

As a result of my process both the magnesium and calcium carbonate are obtained in a condition of great purity. I may further facilitate the recovery of the magnesium carbonate from the bicarbonate solution by adding calcined magnesite, as described in United States Letters Patent No. 689,345, granted to me under date of December 17, 1901; but instead of this I prefer to employ a portion of the magnesia sludge from the bottom of the carbonating-tank J. This magnesia sludge when introduced into the bicarbonate solution reduces the magnesia salt to a carbonate in the manner described in the patent to which I have referred, and it is one of the advantages of my present process that I am able by reason of the preliminary separation of the lime and magnesia to obtain the requisite magnesium oxid for effecting this reaction as a part of the process itself instead of from an external source.

Having thus described my invention, I claim—

1. The process of obtaining magnesium carbonate from dolomite, which consists; first, in allowing a mixture of water and calcined dolomite to settle until the magnesia has been precipitated; second, in withdrawing the precipitated magnesia and subjecting it to carbonation, whereby a solution of magnesium bicarbonate is produced; third, in reducing the magnesium bicarbonate to carbonate and recovering the same, substantially as described.

2. The process of obtaining magnesium and calcium carbonates from dolomite, which consists; first, in allowing a mixture of water and calcined dolomite to settle until the lime goes into solution and the magnesia is precipitated; second, in subjecting the lime-water thus produced to carbonation, whereby the lime is recovered, and also subjecting the magnesia mixed with water to carbonation, whereby a solution of magnesium bicarbonate is produced; and third, in reducing the magnesium bicarbonate to carbonate and recovering the same, substantially as described.

3. The process of obtaining magnesium carbonate from dolomite which consists in, first, allowing a mixture of water and calcined dolomite to settle until the lime goes into solution and the magnesia is precipitated; second, subjecting part of the magnesia thus obtained to carbonation, whereby a solution of magnesium bicarbonate is produced; third, adding to the bicarbonate solution the rest of the magnesia, and recovering the resulting carbonate, substantially as described.

4. The process of obtaining magnesium and calcium carbonates from dolomite, which consists in allowing a mixture of water and calcined dolomite to settle until the lime goes into solution and the magnesia is precipitated; subjecting the lime to carbonation and recovering the carbonate; subjecting the magnesia to carbonation, whereby a solution of magnesium bicarbonate is produced; and reducing the magnesium bicarbonate to carbonate, and recovering the same, substantially as described.

5. The process of obtaining magnesium carbonate which consists in allowing a milk or emulsion of magnesia to drip down through an atmosphere of carbonic-acid gas in a percolating-tower; whereby a solution of magnesium bicarbonate is produced; and then reducing the bicarbonate in the solution to carbonate by the addition of magnesia and recovering the same, substantially as described.

FRANK S. YOUNG.

Witnesses:
JAMES H. BELL,
E. REESE.